(12) United States Patent
Nagarajappa et al.

(10) Patent No.: US 11,107,141 B1
(45) Date of Patent: Aug. 31, 2021

(54) BOT-TO-BOT INTELLIGENCE FOR TRANSACTIONS AND INTERACTIONS

(71) Applicant: Wells Fargo Bank, N.A., San Francisco, CA (US)

(72) Inventors: Sadananda Kalappanahally Nagarajappa, Bangalore (IN); Venu Andra, San Francisco, CA (US); Nathan Matthew Comstock, El Cerrito, CA (US); Balinder Singh Mangat, Castro Valley, CA (US); Nathan Craig Bricklin, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 174 days.

(21) Appl. No.: 15/655,204

(22) Filed: Jul. 20, 2017

(51) Int. Cl.
   *G06Q 30/06* (2012.01)
   *G06Q 20/02* (2012.01)

(52) U.S. Cl.
   CPC ......... *G06Q 30/0617* (2013.01); *G06Q 20/02* (2013.01)

(58) Field of Classification Search
   CPC .... G06Q 30/0617; G06Q 20/02; H04L 63/08; H04L 51/02
   See application file for complete search history.

(56) References Cited

U.S. PATENT DOCUMENTS

| | | | |
|---|---|---|---|
| 7,039,654 B1 | 5/2006 | Eder | |
| 7,454,469 B2 | 11/2008 | Zhou et al. | |
| 7,562,115 B2 | 7/2009 | Zircher et al. | |
| 7,752,554 B2 | 7/2010 | Biggs et al. | |
| 7,861,252 B2 | 12/2010 | Uszok et al. | |
| 9,043,407 B1 | 5/2015 | Gaulke et al. | |
| 9,450,901 B1 | 9/2016 | Smullen et al. | |
| 10,484,347 B2 * | 11/2019 | Kim | H04L 63/0442 |

(Continued)

FOREIGN PATENT DOCUMENTS

WO    2002077816 A1    10/2002

OTHER PUBLICATIONS

Mordatch, Igor, "Emergence of Grounded Compositional Language in Multi-Agent Populations", arXiv:1703.04908v1, 10 pgs.

*Primary Examiner* — Florian M Zeender
*Assistant Examiner* — Vanessa Deligi
(74) *Attorney, Agent, or Firm* — Schwegman Lundberg & Woessner, P.A.

(57) ABSTRACT

Various methods and systems are disclosed for managing and facilitating bot-to-bot transactions, implemented with electronic operations and communications in connection with a bot interaction framework service. In an example, a transaction in a bot-to-bot communication session is established and conducted via the bot interaction framework service using a series of communication, trust, and functional attributes. The processing operations performed by the bot interaction framework service may include: receiving a request for a transaction, for a transaction to be conducted via a bot-to-bot communication session between the user bot and the service bot; identifying communication, trust, and functional attributes for the bot-to-bot communication session; transmitting the communication, trust, and functional attributes to the user bot; and conducting the bot-to-bot communication session based on the communication, trust, and functional attributes.

20 Claims, 5 Drawing Sheets

(56) References Cited

U.S. PATENT DOCUMENTS

| | | | |
|---|---|---|---|
| 2007/0043878 A1 | 2/2007 | Carlson et al. | |
| 2007/0168480 A1 | 7/2007 | Biggs et al. | |
| 2016/0044380 A1* | 2/2016 | Barrett | H04N 21/812 |
| | | | 725/53 |
| 2016/0125460 A1* | 5/2016 | Zellner | G06Q 30/0631 |
| | | | 705/14.53 |
| 2017/0230312 A1* | 8/2017 | Barrett | H04L 51/02 |
| 2017/0244652 A1* | 8/2017 | Clarke | H04L 67/306 |
| 2017/0357638 A1* | 12/2017 | Schlesinger | G06F 16/3344 |
| 2017/0358299 A1* | 12/2017 | Schlesinger | G06F 16/3329 |
| 2017/0366481 A1* | 12/2017 | Sagar | H04L 67/306 |

\* cited by examiner

BOT-TO-BOT INTELLIGENCE FOR TRANSACTIONS AND INTERACTIONS

TECHNICAL FIELD

Embodiments described herein generally relate to electronic communication and processing activities occurring in connection with automated or autonomous software applications, and in particular, but not by way of limitation, to a system and method for conducting transaction and interactions among bots and other agent-based software applications and interfaces.

BACKGROUND

Bots and other forms of automated or autonomous software applications are gaining increasing popularity and relevance. For example, human-facing bots are currently used in a variety of consumer-to-business settings, such as where a human-interacting bot provides targeted information and suggestions, answers basic questions from a human user, and can be tasked to perform certain commands or activities on behalf of human user. A variety of interactions may occur in communication sessions with bots, particularly in deployments of bots in graphical or voice user interfaces within mobile devices, desktop operating systems, smart speakers, and the like.

The usage of bots by human users is expected to increase significantly in the future, as bots begin to embody additional artificial intelligence features and offer new forms of human-to-computer interaction. Bots are also expected to serve a variety of roles on behalf of human users, including to perform many types of tasks for a human user without direct human oversight. However, existing forms of bots cannot act in a truly autonomous manner on behalf of humans, because many bots are designed to interface with human users rather than with other bots or electronic agents. As a result, existing forms of bots often require manual instruction and commands to be triggered by a human user and have limited applicability for some tasks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

In various examples described herein, a bot interaction framework is provided to facilitate transactions and communications among autonomous or task-based electronic user agent bots and other forms of bots. The bot interaction framework operates to establish and communicate trust, communication, and functionality attributes and models for various types of bot-to-bot transactions and bot-to-bot communication sessions that may occur in an automated fashion. Accompanying processing methods used with the bot interaction framework may utilize the trust, communication, and functionality attributes and models to perform certain pre-authorized actions and activities on behalf of a human, including in a variety of business, service, and technical settings.

Although human-facing bots are now increasing in use, there are not any standardized protocols, communication languages, or unified approaches for bots to exchange information and data with each other. This presents a significant technical problem, because many consumers intend to use bots in the future to perform actions on their behalf automatically and autonomously (and without direct human supervision or input). The techniques discussed herein provide standardized and machine-implementable approaches to enable these types of bot-to-bot transactions and machine-to-machine interactions with customized levels of interaction and activity sophistication.

In an example further discussed herein, a trust model is defined for bot-to-bot transactions and bot-to-bot interactions, to implement features of authentication, security, secrecy, authorization, delegation, and similar aspects of trust. This trust model may enable a consumer- or machine-facing bot to perform certain pre-authorized actions and activities on behalf of a controlling human, and also receive verification that the requesting bot and the responding bot operate in an intended manner.

In an example further discussed herein, a communication model is defined for bot-to-bot transactions and bot-to-bot interactions, to implement features of data exchanges among bots and a framework that exchanges information for automated actions and activities (e.g., bot-initiated or bot-managed transactions). This communication model may include the definition of bot languages and communication schemas that enable bots to perform communications directly with each other, including the secure communication of aggregated action information, identity and authentication information, rule and parameter information, and the similar aspects of communication for use among bots and associated services.

In an example further discussed herein, the functionality model is defined for bot-to-bot transactions and bot-to-bot interactions, to implement and define features of rules and actions that may accomplish various transactions and activities within a bot-to-bot communication session. This functionality model may be extended to the performance of various business, financial, legal, or personal transactions on behalf of a human, and aspects of delegation that allow a bot to initiate actions and perform transactions as a fully authorized agent on behalf of the human.

Existing approaches do not offer standardized protocols or communication languages that enable bots to exchange information and data with each other. Likewise, existing approaches do not implement a standardized protocol to define how a bot can operate in an autonomous manner on behalf of a human user. The techniques described herein provide technical measures to address these and other limitations of current architectures, including the maintenance of data for a trust model, functionality model, and communication model. In an example, these models are maintained by a bot interaction framework service, operating as a service that provides a standardized approach to manage and use each of these data models.

As discussed herein, the present systems and techniques are applicable to bots provided in a variety of form factors, and thus the present systems and techniques include but are not limited to personal assistant agent bots that are triggered from human communications. Further, the present systems and techniques may be relevant to use in any number of machine agent scenarios, including machine agent bots that do not directly include a human user interface. Although the present systems and techniques are discussed in the context of bot-to-bot transactions involving business and financial transactions, it will be understood that the techniques may be used for communications in a variety of settings involving many technical or personal activities.

Figure 1:
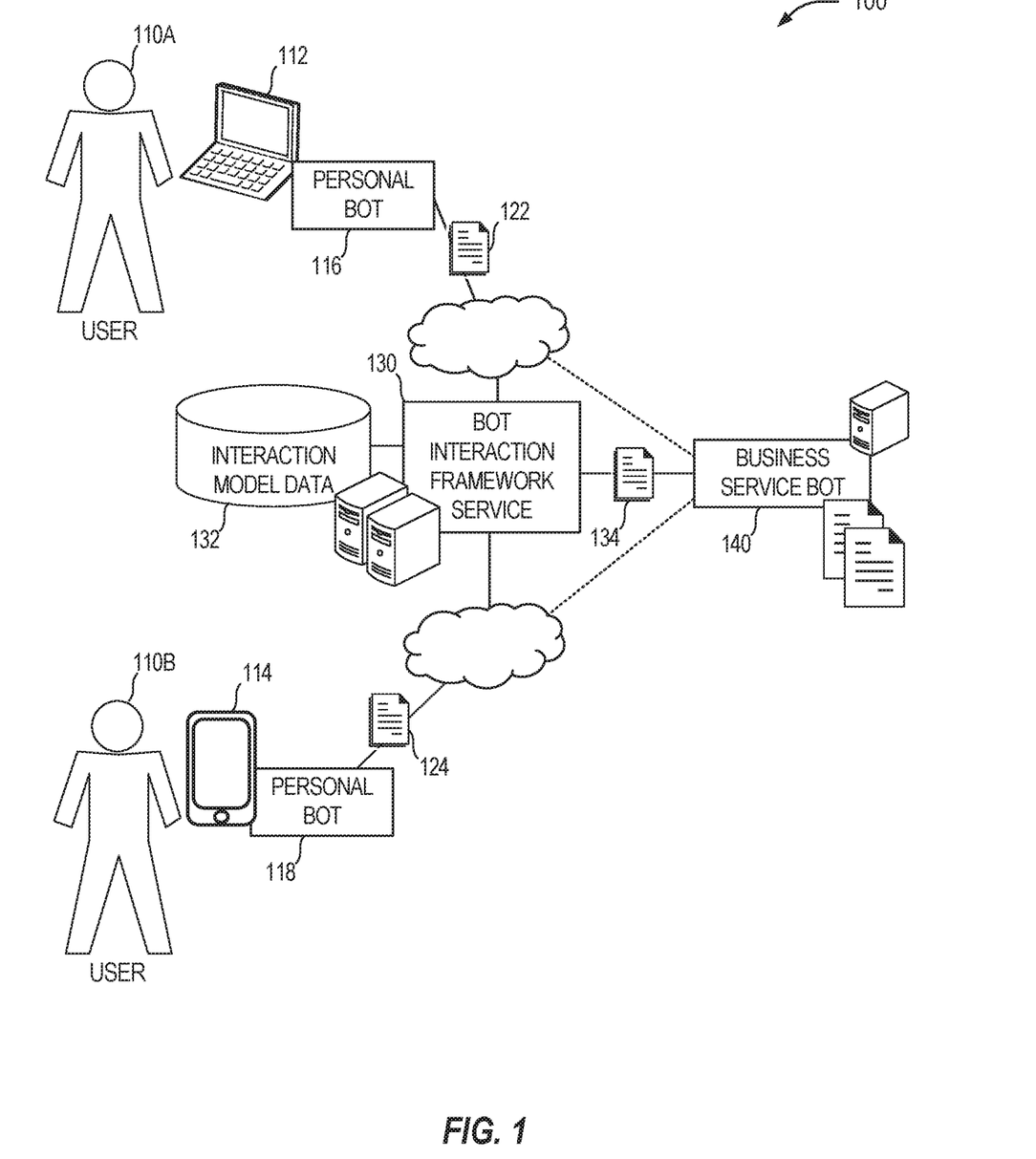
FIG. 1 is a diagram of an electronic communication environment depicting operations and interactions within a bot-to-bot communication framework, according to various examples.

FIG. 1 is a diagram of an electronic communication environment 100 depicting operations and interactions within a bot-to-bot communication framework. FIG. 1 specifically illustrates a scenario in which a first user 110A operates a computing device 112 (e.g., a personal computer) that provides an interface to (e.g., executes, operates, or controls) a first personal bot 116. In a similar fashion, a second user 110B operates a computing device 114 (e.g., a mobile device) that provides an interface to (e.g., executes, operates, or controls) a first personal bot 118. Additionally, a business service bot 140 is depicted within the communication environment 100 as operating on a computing system (e.g., by a cloud or network-based computing platform) on behalf of a business entity.

In conventional approaches, the personal bots 116, 118 are controlled by the human user 110A, 110B to communicate with a specialized service or interface (such as a personal assistant service interface) in order to conduct some transaction or action. In such scenarios, each instance of the personal bots 116, 118 would be unaware of other bots or autonomous agents. Likewise, in conventional approaches, the human user 110A, 110B would need to directly interface with the business service bot 140 in order to perform some transaction. With use of a bot interaction framework service 130, discussed herein, bot-to-bot transactions may be organized and coordinated.

As further shown in the communication environment 100 of FIG. 1, the bot interaction framework service 130 is connected to one or more bots, such as the personal bots 116, 118, and the business service bot 140. The bot interaction framework service 130 maintains an interaction model data store 132 that hosts interaction model data for various bot-to-bot sessions, transactions, and activities (such as hosted for attributes of the trust, functionality, and communication models depicted in FIG. 2, and discussed below). Other types of data values may be maintained or stored by the bot interaction framework service 130 to facilitate bot-to-bot communications among the bots 116, 118, 140.

The communication environment 100 further illustrates the communication of data 122 that is transmitted (e.g., via a first network) from the personal bot 116 to the bot interaction framework service 130, and the communication of data 124 that is transmitted (e.g., via a second network) from the personal bot 118 to the bot interaction framework service 130. In an example, the data 122, 124 involves one or more bot interaction requests and various data model attributes that are exchanged among the personal bots 116, 118 and the bot interaction framework service 130, in connection with a bot-to-bot transaction (such as provided in the transactions and communications depicted in FIG. 3, discussed below). The business service bot 140 may also exchange and communicate data 134 with the bot interaction framework service 130 in connection with a bot-to-bot transaction.

In an example, the data 122, 124, 134 is communicated from the bot interaction framework service 130 to the respective bots, and used to establish direct communication sessions between the bots. For instance, the data 122, 124, 134 may specify trust, functionality, or communication parameters that allow bots to directly conduct transactions with each other with machine-to-machine interactions. In other examples, the data 122, 124, 134 is communicated via the bot interaction framework service 130, and the bot interaction framework service 130 serves as an intermediary for the various bot-to-bot transactions to enable bots to indirectly contact and conduct transactions with each other. Accordingly, via the bot interaction framework service 130, a bot may serve as a delegation of a human user's identity and authentication, and perform many automated agent actions on behalf of the user with other bots.

In an example, bot-to-bot interactions may be used to accomplish tasks on behalf of the human user 110A, 110B, such as financial tasks (e.g., submitting a mortgage application, requesting a car loan, transferring funds between accounts) coordinated between bots (e.g., coordinated between a financial institution bot and a consumer bot). The bot interaction framework service 130 may be used to coordinate permissions between bots to perform the financial tasks and related financial activities. For example, a bot may be authorized with a human user's permission to provide identification, credit history, employment history, or some subset on behalf of a user, to a financial institution. The human user may define a limited set of scenarios in which the information may be used (e.g., in the context of a particular business transaction, in any transaction with the business, in any transaction with a particular type of bot, or the like). Thus, with use of the techniques discussed herein, a user bot may be customized to perform autonomous communication actions with other bots, but still be under the control or guidance of a user's authorizations and a user's preferences.

Also in an example, the personal bots 116, 118 may serve as an authentication for a human user 110A, 110B, and may act on behalf of a particular human user to accomplish actions automatically or on-demand. Additionally, the personal bots 116, 118 may utilize the bot interaction framework service 130 and act as a source of identity (an identity store) for the human user 110A, 110B. This identity store may provide information that the bot learns over time. For instance, the bot may identify and learn user preferences and user activities occurring over time, allowing the bot to develop biases or personality traits that match the user. As a result, over time, the bot may be adapted to act on behalf of a user with minimal input. Additionally, this identity store may encompass details of the human's actions for purposes of verification (e.g., to verify the identity of a human user with a financial institution, with a social network, with a service interface, and the like).

Also in an example, through use of the bot interaction framework service 130, the personal bots 116, 118 may be utilized as a source of smart information for the human. The bot interaction framework service 130 provides features and capabilities that allow the personal bots 116, 118 to providing a validated answer to inquiries such as, "what am I" and "what do I know", and the like. In a similar manner, the personal bots 116, 118 may also provide an aggregate of current information, such as "where am I now", "what can I do now". Further, the bot interaction framework service 130 allows the personal bots 116, 118 to maintain respective identities (for respective humans), while allowing each bot's identity and capability to keep growing and being added onto.

Bot-to-bot communication may occur in a variety of transactions and settings, because a bot offers a human-deployable interface that a user may converse and engage with as a personal agent. Further, bots provide significant advantages to users in that they may provide a natural language interface to control and cause the bot to launch some transaction. In the same manner that the bot provides a human language interface while operating as a controllable system, bot-to-bot communication may provide similar exchanges of predefined language, to launch and respond to transactions without the use of specialized programming or data schemas.

Continuing from the examples discussed above, FIG. 2 provides a diagram depicting data exchanges occurring among bots within a bot-to-bot communication framework. A set of user bots 210, including user bot 1 211 and user bot 2 212, communicate via data transactions over a network to service bots 220, including communications to service bot 1 221 and service bot 2 222, facilitated via the bot interaction framework service 130.

Figure 2:
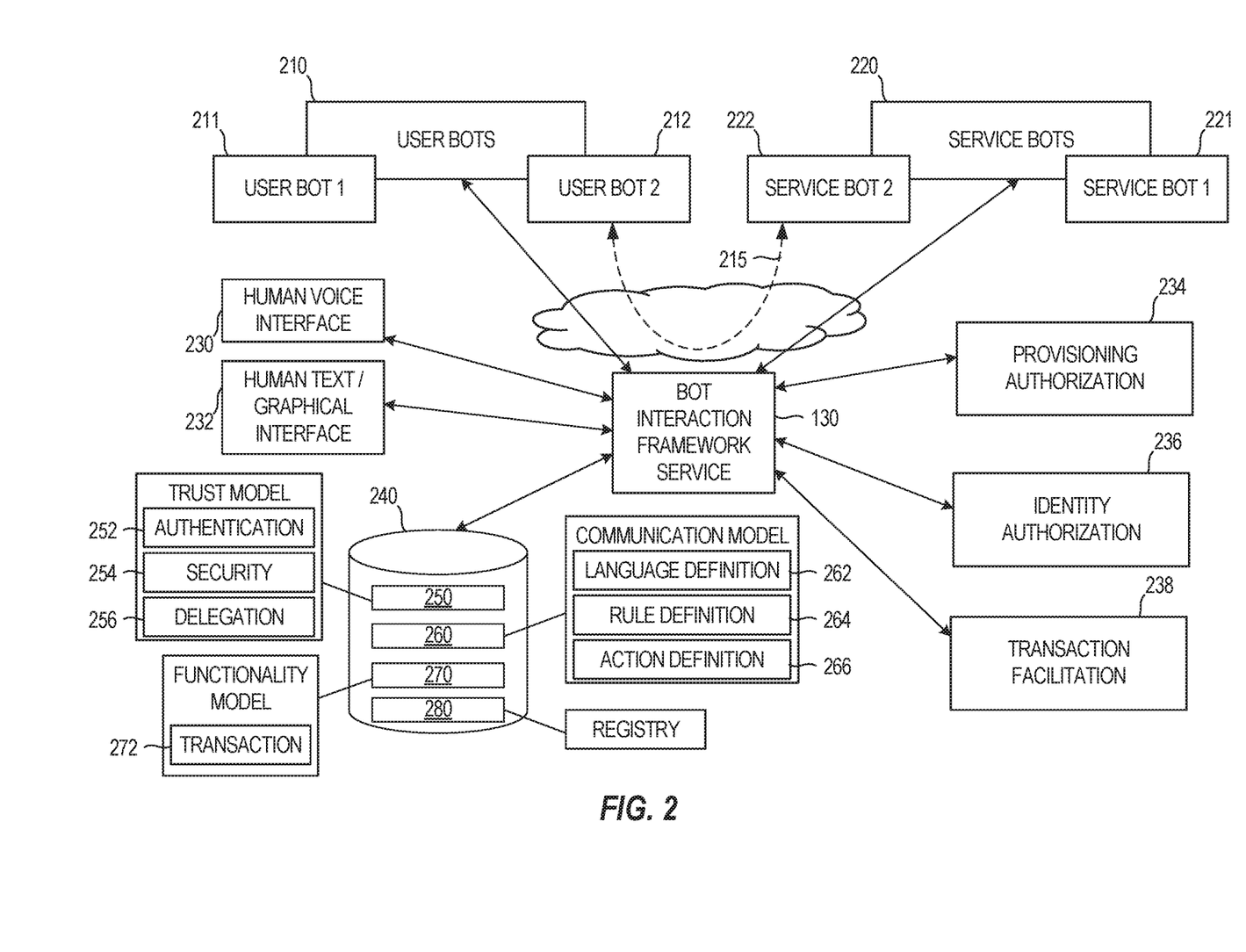
FIG. 2 is a diagram depicting data exchanges occurring among bots within a bot-to-bot communication framework, according to various examples.

The bot interaction framework service 130 is integrated with a set of interfaces, depicted as a human voice interface 230, and a human text or graphical interface 232, which allow for control by a human user. For example, the human user may invoke the human voice interface 230 or the human text or graphical interface 232 to instruct the bot interaction framework service to authorize, subscribe, initiate, de-authorize, unsubscribe, or stop certain actions, transactions, or bots. In an example not depicted, the human voice interface 230 and the human text or graphical interface 232 may directly communicate with the user bots 210 to obtain preferences, authorizations, or other information on behalf of the human user. The interfaces 230, 232 may also be directly engaged with the user bots 210 and service bots 220 (such as for user bots 210 and service bots 220 that communicate using natural language commands).

The bot interaction framework service 130 is integrated with a data store 240 to manage various data for use in the data exchanges between the various bots, through data models including a trust model 250, a communication model 260, a functionality model 270, and a registry 280. The features of these various data models are discussed below.

In an example, the trust model 250 maintains data for configuring aspects of trust and authorization of transactions via bot-to-bot communications, such as may be provided from authentication data 252 (e.g., to define authentication protocols), security data 254 (e.g., to define security parameters for use in secure communications), and delegation data 256 (e.g., to define what actions that the bot has been delegated to perform).

In an example, the communication model 260 maintains data for configuring aspects of transactions via bot-to-bot communications, such as may be provided from language definition data 262 (e.g., to define what machine or human-readable language that the bots may use to communicate with each other), rule definition data 264 (e.g., to establish rules that define how and when to perform the bot-to-bot communications), and action definition data 266 (e.g., to establish what sort of actions, such as identity validation, that a particular bot is capable of communicating within the bot-to-bot communications). Further, the language definition 262 may be used to define a schema or guide for how respective bots may communicate, in the form of individual queries that are asked, or a package of information that may be provided or parsed via individual bots.

In an example, the functionality model 270 maintains data for configuring aspects of functionality via bot-to-bot communications, such as may be provided from transaction data 272 (e.g., to define what types of transactions and transaction conditions may be performed with the bot-to-bot communications). The transaction data 272 may also be used to define parameters involved with temporary or limited transaction authorization. As one specific type of example, the transaction data 272 may track capabilities of a bot that is temporarily authorized for legal actions, transactions, or is even provided with power of attorney on behalf of a human to perform certain business or financial transactions. In this manner, a bot may be assigned with certain transaction privileges assigned by the owner of the bot (a human user) to conduct certain functions, and the bot may be temporarily or permanently authorized to perform certain transactions with such functions.

In an example, the registry 280 is used to track the various bots that are operable or communicable on behalf of a user or user account, such as to define what bots (e.g., the user bots 210) that are registered and authorized on behalf of the user or the user's behalf. The registry 280 thus may track the capabilities and use of various bots (e.g., bots 210, 220), and serve as a trusted store to manage which bot can act on behalf of a particular human, what actions can be performed, and what types of privileges have been assigned with the respective bot. For instance, the registry 280 may be updated and operated by the bot interaction framework service 130 (e.g., a trusted third party) based on transactions between the user bots 210 and the service bots 220, allowing additional bots and bot transactions to be authorized and validated on a user's behalf. Further, the registry 280 may serve to facilitate communications between known bots (including to facilitate direct bot-to-bot communications 215 between bots 212, 222 that bypass portions of the bot interaction framework service 130).

In an example, the bot interaction framework service 130 also includes or integrates with functionality to direct aspects of the bot-to-bot communications, such as provided by one of more of: provisioning authorization 234, identity authorization 236, and transaction facilitation 238 functionality. As an example, the provisioning authorization 234 may provide the ability to enable, disable, or establish communication parameters for a bot-to-bot communication session, directly between bots or via the bot interaction framework service 130. As another example, the identity authorization 236 may provide the ability to securely and authentically exchange identity information for a bot-to-bot communication session (e.g., a session that provides an identity exchange transaction), for communications directly between bots or via the bot interaction framework service 130. As another example, the transaction facilitation 238 may provide the ability to initiate, start, stop, or control transactions via a bot-to-bot communication session, for a session conducted directly between bots or via the bot interaction framework service 130.

In a further example, the identity authorization 236 is managed by the bot interaction framework service to validate the identity of a bot or a human user associated with the bot, so that autonomous actions may occur. For example, the identity authorization 236 may verify and certify the identity of the human that provisioned the user bot for a session, for a predefined period of time, on an ongoing basis until revoked, or the like. In a further example, the identity authorization 236 may be used to authenticate with the human user repeatedly or on a scheduled basis for a session, such as asking for a human to attest to some information, and provide biometric (e.g., fingerprint, retina) or authentication (username, password, PIN, etc.) information to validate a session. Also in a further example, the identity authorization 236 may be employed to assist a bot with a managed identity on behalf of single user, a family, a business team, a group, an organization, or the like. In still further examples, the identity authorization may manage an identity delegation from a user or a group of users to accomplish certain actions via a bot or sets of bots. In still further examples, service bots 220 such as bots operated on behalf of government or business organizations may associate a trusted bot identity with a human user's identity through operation of the identity authorization 236.

In a further example, the transaction facilitation 238 may operate to allow fully autonomous or near-autonomous transactions to be executed between the user bots 210 and the service bots 220. In this manner, the bot interaction framework service 130 may facilitate a type of "autopilot" mode to allow bots to perform transactions automatically. In a further example, the transaction facilitation 238 may operate to predict the need for authorization or elevation of privileges so that the bot may accomplish a certain transaction, action, or event on behalf of a human user. Also in a further example, the transaction facilitation 238 may operate to invoke human input if human intervention is needed to perform the transaction, such as by instructing the user bot 210 to request the relevant information from the human user (e.g., biometric authentication, specific authorization, data inputs). Also in still further examples, the transaction facilitation 238 may operate with use of the human voice interface 230 or the human text or graphical interface 232 to provide a machine-to-human interface on behalf of the user bots 210 (e.g., to allow the user bots 210 to automatically instruct a second human user to perform some transaction on behalf of the bot's owner (the first human user)).

In an example, a human user may authorize a bot (e.g., user bots 211, 212) to perform some action for a temporary or ongoing basis on the human user's behalf. However, such actions may not be intended if the state of the person or service changes, or if the person or service is no longer authorized to continue with the transaction. Thus, in further examples, the identity authorization 236 and transaction facilitation 238 may jointly operate to verify that a particular bot remains authorized by the human user, that the bot (the user bot or the service bot) has not become compromised, and that the transaction remains appropriate to perform on behalf of the human user.

In a further example, the bot interaction framework service 130 manages the registry 280 or other aspects of the data store 240 through the use of a blockchain, which provides a distributed data store for managing identity. Other forms of distributed or remotely verified data stores for managing bot identity, trust information, functionality information, or communication information, may be integrated with use of the bot interaction framework service 130.

In an example where the service bots 220 are adapted to perform some business, financial, or legal transaction on behalf of a human, provisioning may be used between the user bots 210 and the service bots 210 to pre-establish a trust relationship via the bot interaction framework service 130. This provisioning may establish that a particular user bot (e.g., user bot 211) may act in subsequent settings on behalf of a user to conduct a particular action in the transaction (e.g., to supply personal information, to provide approval); and that a particular service bot (e.g., service bot 221) may act on behalf of a service provider to implement a particular action in the transaction (e.g., to query for personal information, or to request approval for an aspect of a business, financial, or legal transaction).

In an example, the registry 280 is extended to provide a repository to manage available and authorized identities among the various service bots 220 and the user bots 210. For instance, customized services and transactions may be provided from the service bots 220 based on the characteristics of the user, the characteristics of the user bot, the type of transaction, and the provisioning activities. As a simple example, a user bot that is operated by a child or minor under 18 years old may be authorized to perform some actions (e.g., check balance of an account, perform small money transfers) but not other types of actions (e.g., cannot open a new account, cannot perform large money transfers, and the like).

Figure 3:
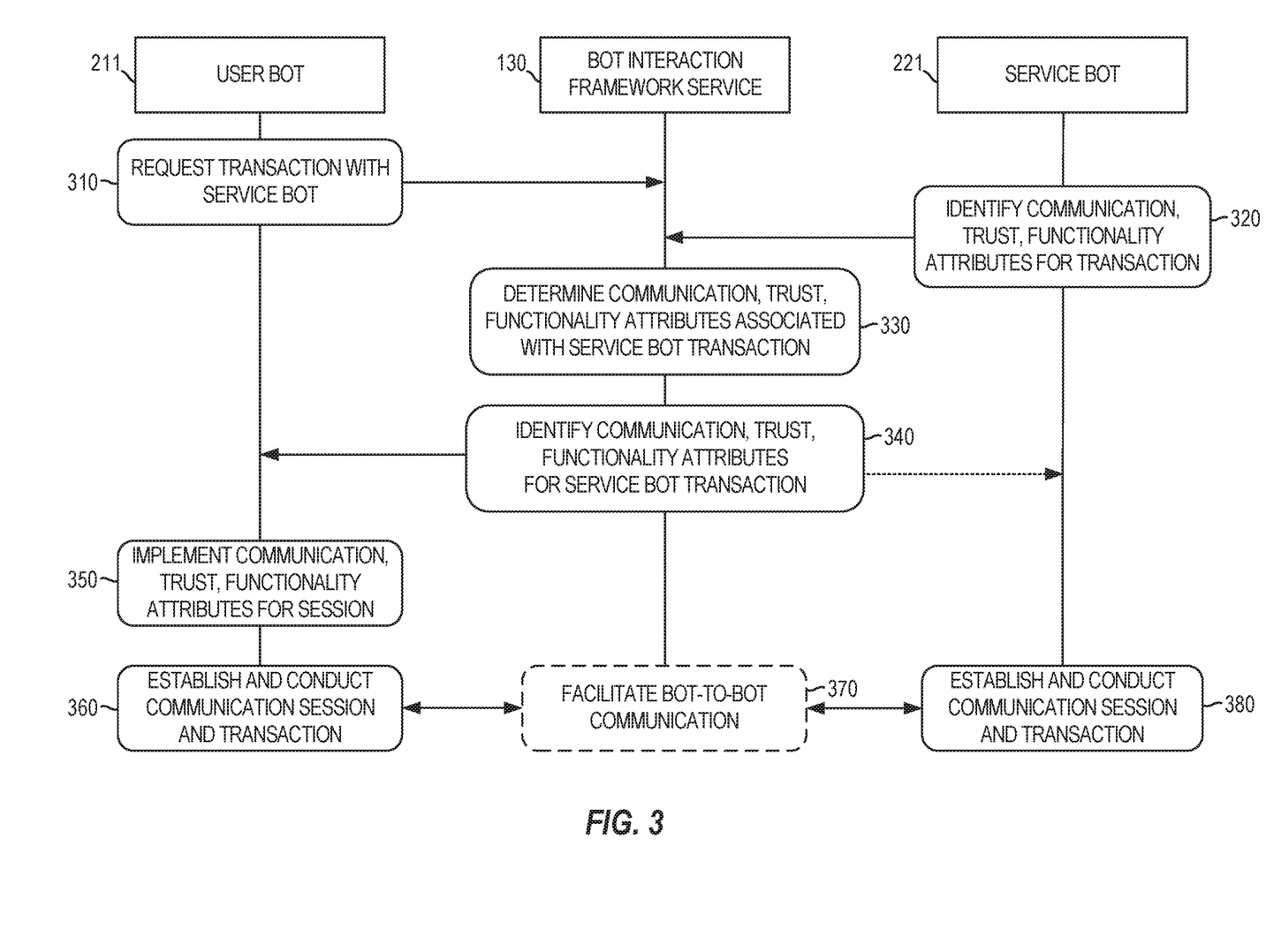
FIG. 3 is a diagram depicting communications between a user bot and a service bot facilitated by a bot communication framework service, according to various examples.

FIG. 3 is a diagram depicting communications between a user bot and a service bot facilitated by a bot communication framework service. Specifically, FIG. 3 illustrates a series of flows between a user bot 211 and a service bot 221, via a bot interaction framework service 130.

In the example depicted in FIG. 3, a communication 310 from the user bot 211 is processed by the bot interaction framework service 130, with the communication 310 indicating a request from a user bot 211 to perform a transaction with a service bot 221. In addition, a communication from the service bot 221 is processed by the bot interaction framework service 130, with the communication 320 indicating an identification of communication, trust, and functionality attributes for a transaction.

In response to the communications 310 and 320, the bot interaction framework service 130 performs evaluation operations 330 that are used to determine the communication, trust, and functionality attributes associated with the service bot transaction between the user bot 211 and the service bot 221. In an example, these determined attributes may define negotiated characteristics of security and authentication, languages or rules used to communicate, available and approved types of transactions and transaction functions, and like characteristics maintained by the bot interaction framework service 130. These determined attributes are then provided, as applicable, from the bot interaction framework service 130 to the user bot 211 with a communication 340. (In some further examples, aspects of the attributes relating to the user bot may also be communicated to the service bot 221).

In response to the communication 340, the user bot 211 may implement all or a portion of the identified communication, trust, and functionality attributes for a bot-to-bot communication session, with implementation operations 350. This is followed by the user bot 211 performing communications 360 to establish and conduct a communication session and transaction, and the service bot 221 performing accompanying communications 380 to establish and conduct the communication session and the transaction. In an example, the bot interaction framework service 130 serves as an intermediary for communications 360, 380 and facilitate the bot-to-bot communication 370; in other examples, the bot interaction framework service 130 provides attributes that allow the bots 211, 221 to directly communicate with each other in a trusted fashion.

In an example, the flows depicted in FIG. 3 allow a bot interaction framework service 130 to negotiate communication prerequisites, in addition to security and functional information, among the user bot 211 and the service bot 221. For example, the bot interaction framework service 130 may negotiate how information is conveyed between bots, such as via a specific encrypted language, or another secure communication mechanism. The bot interaction framework service 130 may also negotiate aspects of confidential information, using the bot interaction framework service 130 as a secure and trusted party.

As a first specific use case example, the bot interaction framework service 130 and the various data models described herein may be used to allow bot-to-bot transactions involving financial instruments, such as in the purchase or trading of stocks, securities, and the like with use of a financial transaction bot. In existing approaches, this negotiation is often manual, and involves a human advisor manually contacting a customer regarding a purchase opportunity, and the customer will respond with a verbal decision and authorization to the human advisor. With use of bot-to-bot transactions, transactions involving certain stocks or securities, or types of recommendations, may be pre-approved and executed by financial transaction bot acting on the user's behalf. Thus, a user bot employed as a financial transaction bot may act in a completely automated manner for portfolio or account management, providing recommendation and execution of certain transactions on a particular day (e.g., to allow a bot to execute trades on behalf of the user, and to interface with an automated trading platform bot that executes the trades).

As a second specific use case example, the bot interaction framework service 130 and the various data models described herein may be used to allow a bot to request and authenticate financial account information. For example, a bot may authenticate the user to do certain actions, such as to access customer account information with current information. For example, when a user opens the mobile app and is presented with an authentication mechanism, instead of the human user typing in authentication information, a user assistant bot may be used to log in to the service, and to command the balance. Further, voice interaction collected by the user assistant bot may be used as an authenticator of the presence of a correct human user associated with the account. Thus, the user assistant bot may identify whether the human user is authorized, whether information presented is current, and whether any particular customized view of information should be provided to the human user.

As a second specific use case example, the bot interaction framework service 130 and the various data models described herein may be used to allow a bot to operate in an autonomous mode for conducting pre-authorized transactions. The user assistant bot may be provisioned to utilize a set of certificate or credentials, to allow execution of an automated (auto pilot) mode with a service bot. Further, the provisioning may allow the establishment of constraints or limits, such as a dollar limit for the user assistant bot to automatically respond or perform transactions. (E.g., if the transaction proposed by the service bot is under a limit, the user assistant bot automatically authorize the transaction on behalf of the human user in an auto pilot mode). The use of a user assistant bot in such settings may be accompanied by a mechanism that allows a financial service bot to automatically notify a user assistant bot if the transaction is available for authorization.

As a fourth specific use case example, the bot interaction framework service 130 and the various data models described herein may be used to facilitate trusted financial payment actions such as the purchase, delivery, or fulfillment of particular items, or the payment of bills or obligations. For instance, a personal financial transaction bot may interact with the bot interaction framework service 130, to identify and learn payment activities and trends, and predict what types of financial transactions that a human user will conduct. From this data, the personal financial transaction bot may predict that the human user needs to buy something, or is likely to purchase an item, and may obtain and execute a transaction based on automatic approval of this purchase (e.g., in connection with an autonomous bot mode described above). Also for instance, if the financial transaction bot knows that a purchase repeatedly occurs on an event date, and the event date is coming up, the personal financial transaction bot may take actions to suggest and execute the purchase transaction (and any accompanying account transfers) on behalf of the human user. In this manner, the personal financial transaction bot may conduct a variety of transactions on behalf of the human user to automatically schedule, approve, and conduct payments or purchases.

Figure 4:
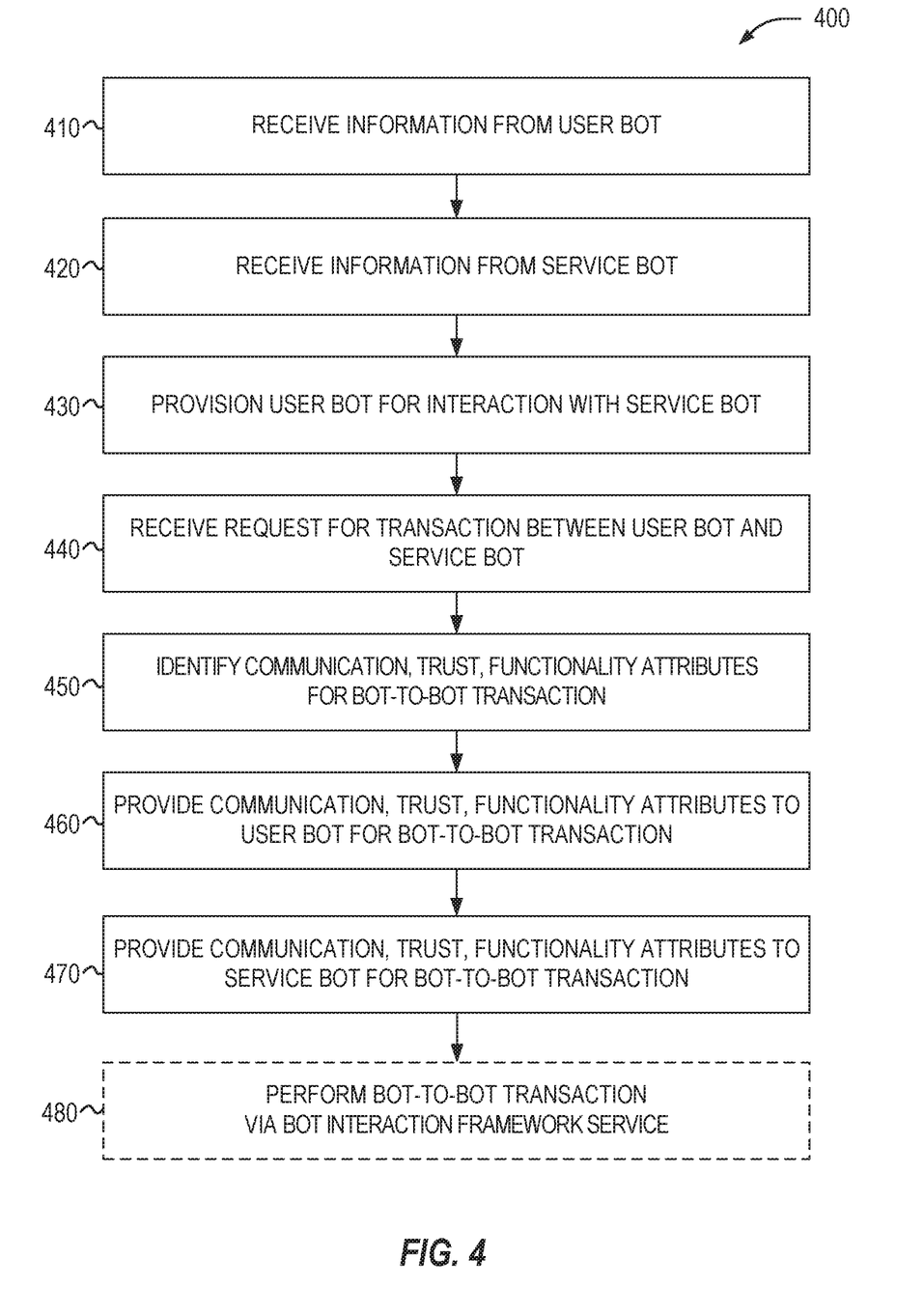
FIG. 4 is a flowchart of an example method for establishing and conducting a transaction in a bot-to-bot communication session via an electronic processing system, according to various examples.

FIG. 4 illustrates a flowchart 400 of an example method for establishing and conducting a transaction in a bot-to-bot communication session via an electronic processing system. The method of the flowchart 400 may be performed by any of the components, logic, or systems described herein. Further, the order and type of the operations depicted in the flowchart 400 may be added, modified, or substituted using any of the operations or functions described above. Thus, although the flowchart 400 and the following operations are depicted from the perspective of a bot interaction framework service, other types of operations and services may be used to perform these or similar operations.

In an example, at operation 410, the method begins with the receipt of information from a user bot. As discussed above, this information may include security information, transaction capabilities, user authorization and preferences, and the like. The method of the flowchart 400 continues with the receipt of information from a service bot at operation 420. Similar security information, transaction capabilities, service authorization and preferences, and the like may be obtained. Based on the information from the user bot and the service bot, the bot interaction framework service may maintain a registry of provisioned user bots to perform respective transactions with service bots (and, as applicable, a registry of service bots to perform respective transactions with provisioned user bots).

The method of the flowchart 400 continues, at operation 430, with the provisioning of a user bot for interaction with service bot. This provisioning may include updating the registry of service bots to allow the user bot to perform a particular transaction via communications with the service bot.

The method of the flowchart 400 continues, at operation 440, with the receipt of a request for a transaction to conduct between a user bot and a service bot. For instance, the transaction may be requested to be conducted via a bot-to-bot communication session between the user bot and the service bot. In an example, the transaction relates to a legal, financial, purchase, or service transaction, for a scenario where the user bot is associated with a human user, and where the service bot is associated with a business entity.

The method of the flowchart 400 continues, at operation 450, with the identification of communication, trust, functionality attributes for the bot-to-bot transaction. In a specific example, the communication attributes indicate: language schema information to perform machine-to-machine interaction in the bot-to-bot communication session, and rule information used to perform the machine-to-machine interaction in the bot-to-bot communication session. In a specific example, the trust attributes indicate: authentication information to validate the user bot and the service bot as being authorized to perform machine-to-machine interaction to conduct the transaction in the bot-to-bot communication session; security information to establish a security context used to perform the machine-to-machine interaction between the user bot and the service bot in the bot-to-bot communication session; and delegation information to perform the transaction in the bot-to-bot communication session on behalf of a human user or another bot. Also in an example, the functionality attributes indicate: transaction information to indicate at least one characteristic of the transaction to perform in a machine-to-machine interaction between the user bot and the service bot in the bot-to-bot communication session.

The method of the flowchart 400 continues, at operation 460, with the communication of the relevant communication, trust, and functionality attributes to the user bot to conduct the bot-to-bot transaction within a bot-to-bot communication session. The method of the flowchart 400 also continues, at operation 470, with the communication of the relevant communication, trust, and functionality attributes to the service bot to conduct the bot-to-bot transaction within the bot-to-bot communication session. The method of the flowchart 400 concludes with an optional operation to allow the respective bots to perform the bot-to-bot transaction within the bot-to-bot communication session via use of the bot interaction framework service (e.g., via indirect communication). In other examples, depicted at operation 480, direct communication between the bots may allow performance of the bot-to-bot transaction.

Although many of the user interface examples included herein were discussed with reference to personal finance transactions and service provider financial bot actions, it will be understood that other variations of the present techniques may be implemented for other types of person-to-person, company-to-person, and company-to-company interactions. Thus, the techniques discussed herein may be applicable for a variety of service industries including financial consultation, regulation, legal services, and business management, in addition to other settings.

The components, methods, applications, and so forth described in conjunction with FIGS. 1-4 are implemented in some embodiments in the context of a machine and an associated software architecture. The paragraphs below describe representative software architecture(s) and machine (e.g., hardware) architecture(s) suitable for use with the disclosed embodiments. For example, software architectures may be used in conjunction with hardware architectures to create devices and machines tailored to particular purposes. For example, a hardware architecture coupled with a software architecture may create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 5:
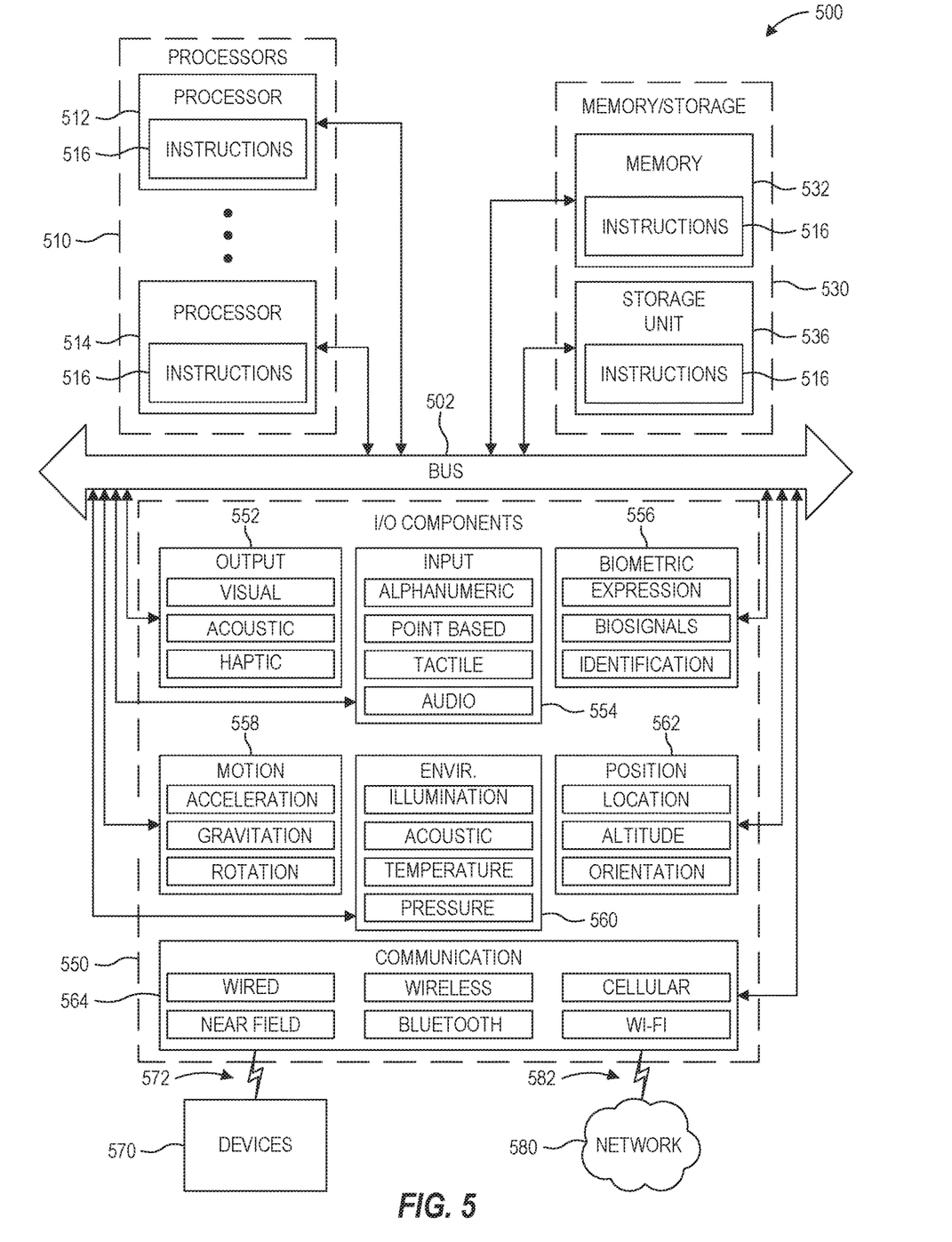
FIG. 5 is a block diagram of a machine in the example form of a computer system within which a set of instructions, for causing the machine to perform any one or more of the methodologies discussed herein, may be executed.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. The instructions 516 transform the machine into a machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, PC, a tablet PC, a hybrid tablet, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. In an example, a processor includes multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

A machine-readable medium includes a device able to store instructions (e.g., instructions 516) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. Thus, a machine-readable medium may include a single medium or multiple media (e.g., a centralized or distributed database, or associated caches and servers) able to store the instructions 516. A machine-readable medium may also include medium, or combination of multiple media, that is capable of storing instructions (e.g., instructions 516, stored in a non-transitory manner) for execution by a machine (e.g., machine 500), such that the instructions, when executed by one or more processors of the machine (e.g., processors 510), cause the machine to perform any one or more of the methodologies described herein. Accordingly, a machine-readable medium refers to a single storage apparatus or device, as well as "cloud-based" storage systems or storage networks that include multiple storage apparatus or devices.

The I/O components 550 may include a wide variety of components to receive input, provide output, produce output, transmit information, exchange information, capture measurements, and the like. The specific I/O components 550 that are included in a particular machine will depend on the type of machine. For example, portable machines such as mobile phones may include a touch input device or other such input mechanisms, while a headless server machine will likely not include such a touch input device. It will be understood that the I/O components 550 may include many other components that are not shown in FIG. 5. The I/O components 550 are grouped according to functionality merely for simplifying the following discussion, as the illustrated grouping is not intended to be limiting. Various components of the following I/O components 550 may be used, for example, in connection with bot-human interaction features in connection with the bots discussed herein.

In various examples, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components, or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

In various examples, one or more portions of the network 580 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a IEEE 802.11 Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, third Generation Partnership Project (3GPP) connection such as via a fourth generation (4G) or fifth generation (5G) wireless network, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, Universal Mobile Telecommunications System (UMTS), High Speed Packet Access (HSPA), Long Term Evolution/Long Term Evolution-Advanced (LTE/LTE-A), Worldwide Interoperability for Microwave Access (WiMAX), including standards of such protocols, communication protocols defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. Thus, a transmission medium may include any intangible medium that is capable of storing, encoding, or carrying the instructions 516 for execution by the machine 500, and includes digital or analog communications signals or other intangible media to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for establishing and conducting a transaction in a bot-to-bot communication session, comprising electronic operations performed by at least one processor and memory of a computing system, the electronic operations comprising:
   receiving a request for the transaction to conduct between a user bot and a service bot, wherein the transaction is requested to be conducted via a bot-to-bot communication session between the user bot and the service bot;
   provisioning the user bot and the service bot to establish a trust relationship between the user bot and the service bot;
   identifying communication attributes, trust attributes, and functional attributes for the bot-to-bot communication session between the user bot and the service bot;
   storing the communication attributes, trust attributes and functional attributes using a distributed data store configured for use in managing bot identity;
   transmitting the communication attributes, trust attributes, and functional attributes to the user bot and the service bot;
   negotiating communication prerequisites between the user bot and the service bot, including determining security requirements for the user bot and the service bot based on the trust attributes; and
   facilitating the bot-to-bot communication session between the user bot and the service bot based on the communication attributes, trust attributes, and functional attributes.

2. The method of claim 1, wherein the electronic operations of the computing system are performed by a bot interaction framework service operating independent from the user bot and the service bot, and wherein the bot-to-bot communication session between the user bot and the service bot is established directly between the user bot and the service bot in response to use of the communication, trust, and functional attributes by the user bot and the service bot.

3. The method of claim 1, the electronic operations further comprising:
   maintaining a registry of provisioned user bots, the registry to perform respective transactions with provisioned service bots; and
   provisioning the user bot to perform the transaction via communications with the service bot, including updating the registry to register the user bot to perform the transaction with the service bot.

4. The method of claim 1, the electronic operations further comprising:
   authorizing an identity of a human user associated with the user bot;
   wherein the identity of the human user is associated with a plurality of identity attributes, and wherein the identity of the human user is used to perform transaction on behalf of the human user.

5. The method of claim 1, the electronic operations further comprising:
   transmitting the communication attributes, trust attributes, and functional attributes to the service bot;
   wherein the request for the transaction is received from the user bot, and wherein the communication attributes, trust attributes, and functional attributes are used by the service bot to identify characteristics of the bot-to-bot communication session.

6. The method of claim 1, wherein the communication attributes indicate:
   language schema information to perform machine-to-machine interaction in the bot-to-bot communication session; and
   rule information used to perform the machine-to-machine interaction in the bot-to-bot communication session.

7. The method of claim 1, wherein the trust attributes indicate:
   authentication information to validate the user bot and the service bot as being authorized to perform machine-to-machine interaction to conduct the transaction in the bot-to-bot communication session;

security information to establish a security context used to perform the machine-to-machine interaction between the user bot and the service bot in the bot-to-bot communication session; and delegation information to perform the transaction in the bot-to-bot communication session on behalf of a human user or another bot.

8. The method of claim 1, wherein the functional attributes indicate:

transaction information to indicate at least one characteristic of the transaction to perform in a machine-to-machine interaction between the user bot and the service bot in the bot-to-bot communication session.

9. The method of claim 1, wherein the transaction relates to a legal, financial, purchase, or service transaction, wherein the user bot is associated with a human user, and wherein the service bot is associated with a business entity.

10. A non-transitory computer-readable storage medium, the computer-readable storage medium including instructions that when executed by a processor of a computer, causes the processor to perform electronic operations that:

receive a request for a transaction to conduct between a user bot and a service bot, wherein the transaction is requested to be conducted via a bot-to-bot communication session between the user bot and the service bot;

provision the user bot and the service bot to establish a trust relationship between the user bot and the service bot;

identify communication attributes, trust attributes, and functional attributes for the bot-to-bot communication session between the user bot and the service bot;

store the communication attributes, trust attributes and functional attributes using a distributed data store configured for use in managing bot identity;

transmit the communication attributes, trust attributes, and functional attributes to the user bot and the service bot;

negotiate communication prerequisites between the user bot and the service bot, including determining security requirements for the user bot and the service bot based on the trust attributes; and facilitate the bot-to-bot communication session between the user bot and the service bot based on the communication attributes, trust attributes, and functional attributes.

11. The computer-readable storage medium of claim 10, the instructions further to cause the computer to:

maintain a registry of provisioned user bots, the registry to perform respective transactions with provisioned service bots; and provision the user bot to perform the transaction via communications with the service bot, including updating the registry to register the user bot to perform the transaction with the service bot.

12. The computer-readable storage medium of claim 11, the instructions further to cause the computer to:

authorize an identity of a human user associated with the user bot;

wherein the identity of the human user is associated with a plurality of identity attributes, and wherein the identity of the human user is used to perform transaction on behalf of the human user.

13. The computer-readable storage medium of claim 10, the instructions further to cause the computer to:

transmit the communication attributes, trust attributes, and functional attributes to the service bot;

wherein the request for the transaction is received from the user bot, and wherein the communication attributes, trust attributes, and functional attributes are used by the service bot to identify characteristics of the bot-to-bot communication session.

14. The computer-readable storage medium of claim 10, wherein the communication attributes indicate:

language schema information to perform machine-to-machine interaction in the bot-to-bot communication session; and rule information used to perform the machine-to-machine interaction in the bot-to-bot communication session.

15. The computer-readable storage medium of claim 10, wherein the trust attributes indicate:

authentication information to validate the user bot and the service bot as being authorized to perform machine-to-machine interaction to conduct the transaction in the bot-to-bot communication session;

security information to establish a security context used to perform the machine-to-machine interaction between the user bot and the service bot in the bot-to-bot communication session; and delegation information to perform the transaction in the bot-to-bot communication session on behalf of a human user or another bot.

16. The computer-readable storage medium of claim 10, wherein the functional attributes indicate:

transaction information to indicate at least one characteristic of the transaction to perform in a machine-to-machine interaction between the user bot and the service bot in the bot-to-bot communication session.

17. A computing system, comprising:

a processor; and a memory device comprising instructions stored thereon, which when executed by the processor, configure the processor to perform electronic operations for establishing and conducting a transaction in a bot-to-bot communication session, with operations that:

receive a request for the transaction to conduct between a user bot and a service bot, wherein the transaction is requested to be conducted via a bot-to-bot communication session between the user bot and the service bot;

provision the user bot and the service bot to establish a trust relationship between the user bot and the service bot;

identify communication attributes, trust attributes, and functional attributes for the bot-to-bot communication session between the user bot and the service bot;

store the communication attributes, trust attributes and functional attributes using a distributed data store configured for use in managing bot identity;

transmit the communication attributes, trust attributes, and functional attributes to the user bot and the service bot;

negotiate communication prerequisites between the user bot and the service bot, including determining security requirements for the user bot and the service bot based on the trust attributes; and facilitate the bot-to-bot communication session between the user bot and the service bot based on the communication attributes, trust attributes, and functional attributes.

18. The computing system of claim 17, further comprising storage hardware implementing a plurality of databases, the plurality of databases including:

a trust attribute database to store:

authentication information to validate the user bot and the service bot as being authorized to perform machine-to-machine interaction to conduct the transaction in the bot-to-bot communication session;

security information to establish a security context used to perform the machine-to-machine interaction between the user bot and the service bot in the bot-to-bot communication session; and delegation information to perform the transaction in the bot-to-bot communication session on behalf of a human user or another bot;

a functionality attribute database to store:

transaction information to indicate at least one characteristic of the transaction to perform in a machine-to-machine interaction between the user bot and the service bot in the bot-to-bot communication session; and a communication attribute database to store:

language schema information to perform machine-to-machine interaction in the bot-to-bot communication session; and rule information used to perform the machine-to-machine interaction in the bot-to-bot communication session; and a registry database to store a registry of provisioned user bots, the registry to perform respective transactions with provisioned service bots, wherein the registry includes data to register the user bot to perform the transaction with the service bot.

19. The computing system of claim 18, wherein the electronic operations of the computing system are performed by a bot interaction framework service operating independent from the user bot and the service bot, and wherein the bot-to-bot communication session between the user bot and the service bot is established directly between the user bot and the service bot in response to use of the communication attributes, trust attributes, and functional attributes by the user bot and the service bot.

20. The computing system of claim 19, the computing system further including operations that:

implement a human interface to the bot interaction framework service, wherein the human interface includes one or more of a voice, text, or graphical interface.

* * * * *